(12) United States Patent
Maleki et al.

(10) Patent No.: US 12,395,938 B2
(45) Date of Patent: Aug. 19, 2025

(54) SELECTIVE TRANSMISSION OR RECEPTION FOR REDUCING UE ENERGY CONSUMPTION

(71) Applicant: Telefonaktiebolaget LM Ericsson (publ), Stockholm (SE)

(72) Inventors: Sina Maleki, Malmö (SE); Ali Nader, Malmö (SE); Andres Reial, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 463 days.

(21) Appl. No.: 17/801,822

(22) PCT Filed: Mar. 2, 2020

(86) PCT No.: PCT/EP2020/055466
§ 371 (c)(1),
(2) Date: Aug. 24, 2022

(87) PCT Pub. No.: WO2021/175408
PCT Pub. Date: Sep. 10, 2021

(65) Prior Publication Data
US 2023/0097818 A1    Mar. 30, 2023

(51) Int. Cl.
*H04W 52/02* (2009.01)
(52) U.S. Cl.
CPC ............... *H04W 52/0248* (2013.01)
(58) Field of Classification Search
CPC . H04W 72/0446; H04W 72/23; H04W 72/21; H04W 74/0833; H04W 72/20;
(Continued)

(56) References Cited

U.S. PATENT DOCUMENTS

2019/0090279 A1   3/2019  Sun et al.
2021/0014893 A1*  1/2021  Park ..................... H04L 5/0092
2021/0045154 A1   2/2021  Ahn et al.

FOREIGN PATENT DOCUMENTS

WO      2019194603 A1    10/2019

OTHER PUBLICATIONS

"3GPP TS 23.501 V15.8.0", 3rd Generation Partnership Project; Technical Specification Group Services and System Aspects; System architecture for the 5G System (5GS); Stage 2 (Release 15), Dec. 2019, pp. 1-248.
(Continued)

*Primary Examiner* — Khalid W Shaheed
(74) *Attorney, Agent, or Firm* — Murphy, Bilak & Homiller, PLLC

(57) ABSTRACT

Embodiments include methods, performed by a user equipment (UE), for selective transmission or reception of signals or channels with a wireless network. Such methods include receiving a first physical downlink control channel (PDCCH) transmission from the wireless network. Such methods also include, without determining whether a signal or channel is scheduled for the UE during a first duration immediately following the first PDCCH transmission, refraining from transmitting or receiving any signals or channels during the first duration. The first duration can be based on one or more of the following: predicted scheduling characteristics for the PDCCH; UE operating conditions; and communication characteristics of an application running on the UE. In some embodiments, such methods can also include determining the predicted scheduling characteristics based on a plurality of second PDCCH transmissions received, from the wireless network, before the first PDCCH transmission. Other embodiments include UEs configured to perform such methods.

22 Claims, 9 Drawing Sheets

(58) Field of Classification Search
CPC ..... H04W 72/02; H04W 24/10; H04W 72/04; H04W 4/06; H04W 72/12; H04W 72/56; H04W 56/001; H04W 76/28; H04W 48/18; H04W 72/30
See application file for complete search history.

(56) References Cited

OTHER PUBLICATIONS

"3GPP TS 38.211 V16.0.0", 3rd Generation Partnership Project; Technical Specification Group Radio Access Network; NR; Physical channels and modulation (Release 16), Dec. 2019, pp. 1-129.

"3GPP Ts 38.214 V15.0.0", 3rd Generation Partnership Project; Technical Specification Group Radio Access Network; NR; Physical layer procedures for data (Release 15), Dec. 2017, pp. 1-71.

"Adaptation aspects of NR UE power saving", 3GPP TSG-RAN WG1 Meeting AH-1901, Tdoc R1-1901166, Taipei, Taiwan, Jan. 21-25, 2019, pp. 1-8.

"Triggering Adaptation of UE Power Consumption Characteristics", 3GPP TSG-RAN WG1 Meeting #94bis; R1-1811283; Chengdu, China, Oct. 8-12, 2018, pp. 1-12.

"3GPP TS 38.213 V16.0.0", 3rd Generation Partnership Project; Technical Specification Group Radio Access Network; NR; Physical layer procedures for control (Release 16), Dec. 2019, pp. 1-146.

"UE Adaptation to the Traffic and UE Power Consumption", 3GPP TSG RAN WG1 #96, R1-1902745, Athens, Greece, Feb. 25-Mar. 1, 2019, pp. 1-14.

* cited by examiner

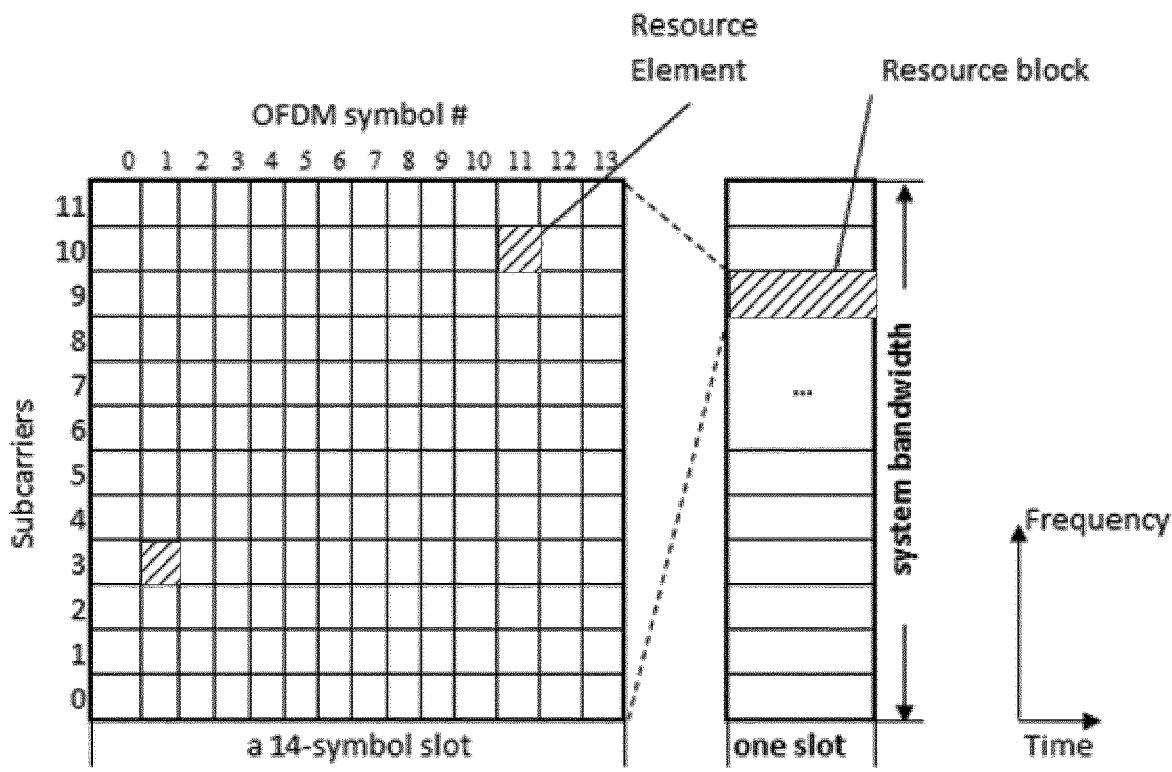
FIG. 6
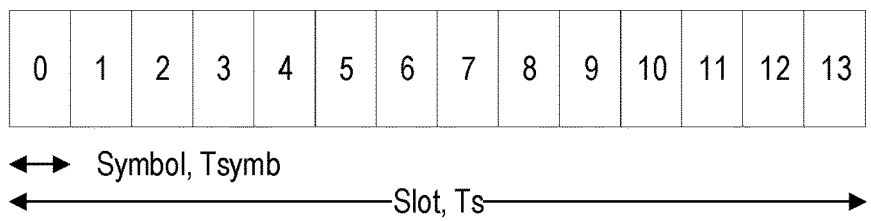
FIG. 7A
FIG. 7B
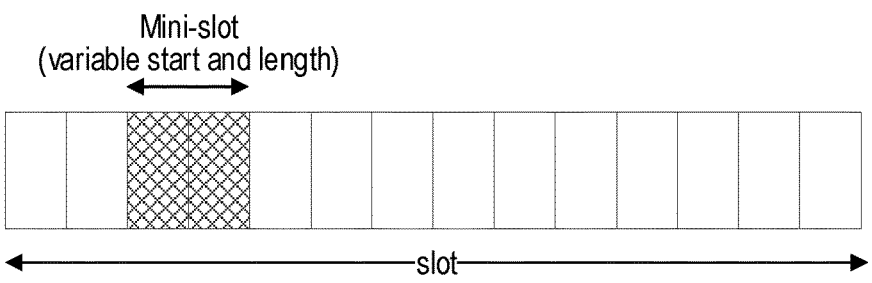
FIG. 7C

SELECTIVE TRANSMISSION OR RECEPTION FOR REDUCING UE ENERGY CONSUMPTION

TECHNICAL FIELD

The present invention generally relates to wireless communication networks, and particularly relates to improvements to user equipment (UE) energy consumption when operating in such networks.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases.

These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Rel-10 supports bandwidths larger than 20 MHz. One important requirement on Rel-10 is to assure backward compatibility with LTE Rel-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labelled 0 through 19, each with a fixed duration of 0.5 ms. A 1-ms subframe comprises two consecutive slots where subframe i consists of slots $2i$ and $2i+1$. Each exemplary DL slot consists of $N_{symb\_DL}$ OFDM symbols, each of which is comprised of $N_{sc}$ OFDM subcarriers. Exemplary values of $N_{symb\_DL}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as discussed above, but comprising $N_{symb\_UL}$ OFDM symbols, each of which includes $N_{sc}$ subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N_{sc}^{RB}$ subcarriers over the duration of a slot (i.e., $N_{symb\_DL}$ symbols), where $N_{sc}^{RB}$ is typically either 12 (with a 15-kHz SCS) or 24 (7.5-kHz SCS). The configuration of 15-kHz SCS and "normal" CP is often referred to as the numerology, μ.

In general, an LTE physical channel corresponds to a set of REs carrying information that originates from higher layers. Downlink (i.e., eNB to UL) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS and SRS mentioned above.

Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

The fifth-generation (5G) NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some properties similar to a "suspended" condition used in LTE.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Furthermore, time-frequency resources can be configured much more flexibly for an NR cell than for an LTE cell. For example, rather than a fixed 15-kHz SCS as in LTE, NR SCS can range from 15 to 240 kHz, with even greater SCS considered for future NR releases.

In both LTE and NR, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, in both LTE and NR, a UE may spend a substantial part of its energy on decoding PDCCH without detecting a DL scheduling assignment or UL resource grant directed to it. Accordingly, techniques that can reduce unnecessary PDCCH monitoring, allow a UE to go to sleep more often, and/or allow a UE to wake up less frequently can be beneficial.

SUMMARY

Embodiments of the present disclosure provide specific improvements to communication between user equipment (UE) and network nodes in a wireless communication network, such as by facilitating solutions to overcome the exemplary problems summarized above and described in more detail below Some exemplary embodiments include methods (e.g., procedures) for selective transmission or reception of signals or channels with a wireless network, according to various exemplary embodiments of the present disclosure. The exemplary method can be performed by a user equipment (UE, e.g., wireless device, MTC device, NB-IoT device, modem, etc. or component thereof) in communication with a wireless network (e.g., E-UTRAN, NG-RAN).

These exemplary methods can include receiving a first physical downlink control channel (PDCCH) transmission from the wireless network. The exemplary method can also include, without determining whether a signal or channel is scheduled for the UE during a first duration immediately following the first PDCCH transmission, refraining from transmitting or receiving any signals or channels during the first duration. The first duration can be based on one or more of the following: one or more predicted scheduling characteristics for the PDCCH; one or more UE operating conditions; and one or more communication characteristics of an application running on the UE.

In some embodiments, the first PDCCH transmission can include an encoded scheduling message. In such embodiments, during at least a portion of the first duration, the UE can decode the scheduling message to determine when the signal or channel is scheduled for the UE.

In other embodiments, the exemplary method can also include, based on the predicted scheduling characteristics for the PDCCH and without determining whether the signal or channel is scheduled for the UE during a second duration following the first duration, monitoring for the signal or channel during the second duration. In such embodiments, the UE can operate in a low-energy state during the first duration and, at the end of the first duration, transition from the low-energy state to a higher-energy operating state used for the monitoring during the second duration.

In some embodiments, the predicted scheduling characteristics for the PDCCH can include one or more predicted minimum offsets between a PDCCH transmission and respective signals or channels scheduled by the PDCCH transmission. In such embodiments, the first duration can be the predicted minimum offset associated with the signal or channel.

In some of these embodiments, the predicted minimum offsets can be based on respective values of one or more configuration parameters, or respective combinations of values of a plurality of configuration parameters. In some of these embodiments, the predicted minimum offset can be zero for a first value or a first combination of values (e.g., indicating same-slot scheduling) and non-zero for a second value or a second combination of values (e.g., indicating cross-slot scheduling). In such embodiments, the configuration parameters can include any of the following: active bandwidth part (BWP); active secondary cell (SCell); use of cross-carrier scheduling; discontinuous reception (DRX) On duration; traffic type; licensed or unlicensed spectrum; radio network temporary identifier (RNTI) type; target block error rate (BLER); PDCCH search space configuration; and CORESET configuration.

In various embodiments, the one or more predicted minimum offsets can include any of:
- a first predicted minimum offset between a PDCCH transmission and physical downlink shared channel (PDSCH) transmission scheduled by the PDCCH transmission;
- a second predicted minimum offset between a PDSCH transmission, scheduled by the PDCCH transmission, and a subsequent physical uplink control channel (PUCCH) transmission;
- a third predicted minimum offset between a PDCCH transmission and physical uplink shared channel (PUSCH) transmission scheduled by the PDCCH transmission;

a fourth predicted minimum offset between a PDCCH transmission and a DL reference signal (RS) scheduled by the PDCCH transmission; and a fifth predicted minimum offset between a PDCCH transmission and an UL sounding reference signal (SRS) scheduled by the PDCCH transmission.

In some embodiments, the exemplary method can also include determining the one or more predicted scheduling characteristics of the PDCCH based on a plurality of second PDCCH transmissions, from the wireless network, that were received prior to the first PDCCH transmission.

In some embodiments, the determining operations can include selecting a first candidate minimum offset between a PDCCH transmission and a signal or channel scheduled by the PDCCH transmission; monitoring for the signal or channel according to the first candidate minimum offset following a first portion of the second PDCCH transmissions; and when a number of successful attempts during the first portion is greater than or equal to a threshold, selecting the first candidate minimum offset as the predicted minimum offset. In some embodiments, the determining operations can also include, when the number of successful attempts during the first portion is less than the threshold, selecting an offset that is less than the first candidate minimum offset as the predicted minimum offset.

In other embodiments, the determining operations can include determining a usage for each of a plurality of available scheduling offsets during the second PDCCH transmissions, and selecting a minimum scheduling offset based on one of the following:

greater than a maximum of the available scheduling offsets that are not used during the second PDCCH transmissions, or a maximum of the available scheduling offsets that are used less than a predetermined percentage of the second PDCCH transmissions.

In some embodiments, the usage for each available scheduling offset can be determined in relation to respective values of one or more operating parameters. In various embodiments, the one or more operating parameters can include any of the following:

amount of energy remaining in the UE's battery;
operating temperature of the UE;
UE transition time between low-energy and higher-energy states;
amount of energy reduction in the low-energy state;
potential increase in block error rate (BLER) due to failure to transmit or receive the signal or channel; and
potential loss of throughput due to failure to transmit or receive the signal or channel.

In some embodiments, the UE can, when the amount of energy remaining in the UE's battery reaches a predetermined threshold, determine the first duration based on a predicted energy savings independent from the predicted scheduling characteristics for the PDCCH. In other words, the UE can refrain from receiving or transmitting any signals or channels during the first duration based on energy savings, regardless if the predicted scheduling characteristics indicated a likelihood that a signal or channel will be scheduled during the first duration.

In some embodiments, refraining from transmitting or receiving any signals or channels during the first duration can be based on one or more communication characteristics of an application running on the UE. In such embodiments, the communication characteristics of the application running on the UE include any of the following:

estimated delay between an uplink transmission associated with the application and scheduling of a responsive downlink transmission; and likelihood of scheduling downlink transmissions associated with the application during UE discontinuous reception (DRX) On durations and/or particular times of day.

In some of these embodiments, the first duration can correspond to the estimated delay or a duration when the likelihood of scheduling downlink transmissions associated with the application is below a threshold.

In some embodiments, the exemplary method can also include, based on refraining from receiving a channel during the first duration, determining an estimated increase in block error rate (BLER) for the channel based on an assumption that the channel was transmitted during the first duration, and reporting a channel quality metric reflecting the estimated increase in BLER to the wireless network.

In some embodiments, the exemplary method can also include, based on receiving a grant of uplink resources after the first duration, determining a failure to receive a channel that was transmitted during the first duration and transmitting a negative acknowledgement using the granted uplink resources. In some of these embodiments, the exemplary method can also include subsequently receiving a third PDCCH transmission from the wireless network and monitoring for the channel during the first duration after the third PDCCH transmission. For example, the first and third PDCCH transmissions can be in respective first and third timeslots, and the first duration can be a remaining portion of a timeslot (e.g., first or third) after a PDCCH transmission (e.g., first or third). Put differently, rather than refraining from transmitting or receiving as in the first duration of the first timeslot, the UE can monitor for (e.g., attempt to receive) a signal in the first duration of the third timeslot.

Other exemplary embodiments include user equipment (UEs, e.g., wireless devices, MTC devices, NB-IoT devices, modems, etc. or components thereof) configured to perform operations corresponding to any of the exemplary methods described herein. Other exemplary embodiments include non-transitory, computer-readable media storing program instructions that, when executed by processing circuitry, configure such UEs to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 6 shows an exemplary time-frequency resource grid for an NR slot.

FIG. 7, which includes FIGS. 7A-C, shows exemplary NR slot and mini-slot configurations.

FIG. 10, which includes

DETAILED DESCRIPTION

Figure 1:
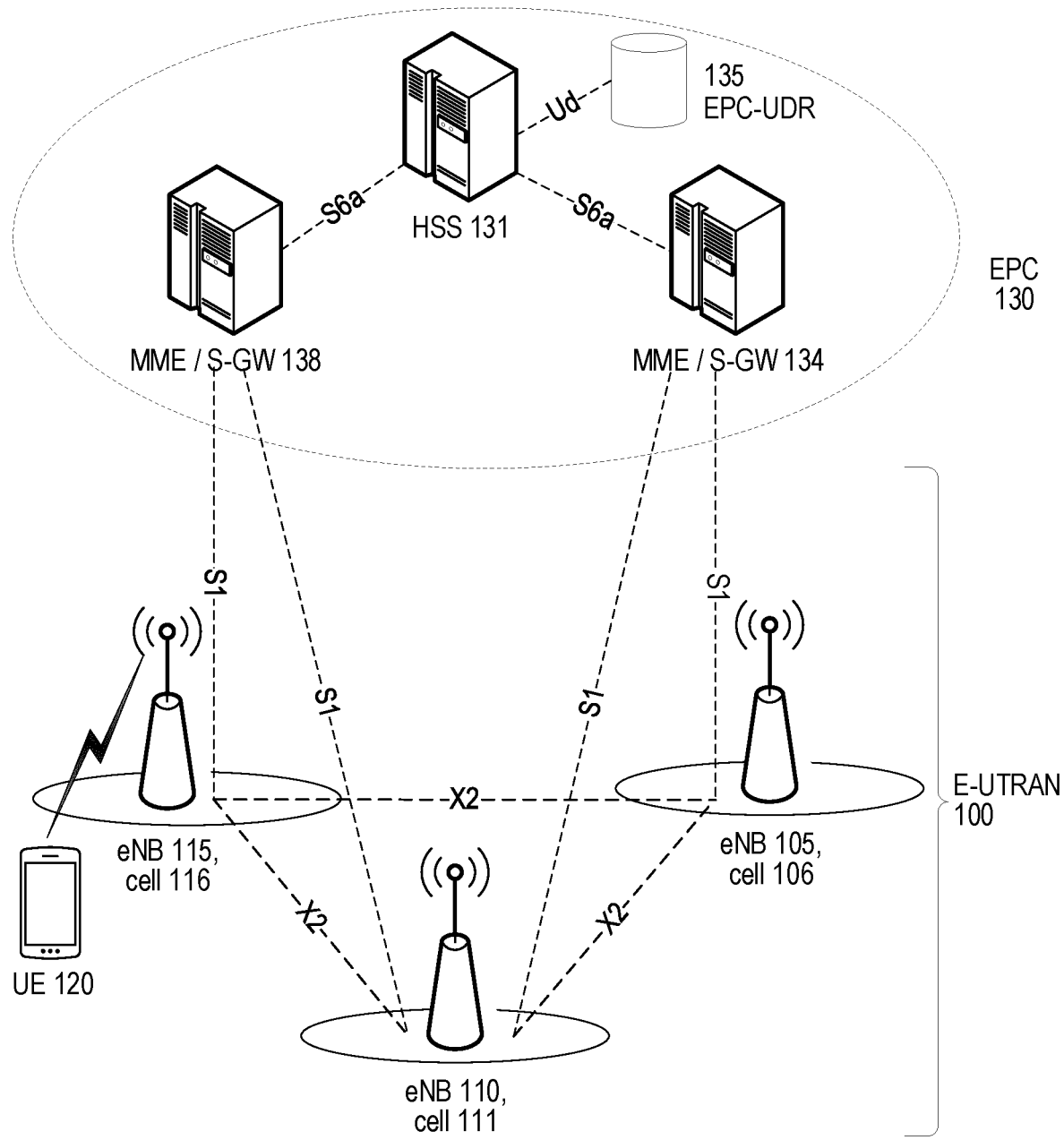
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
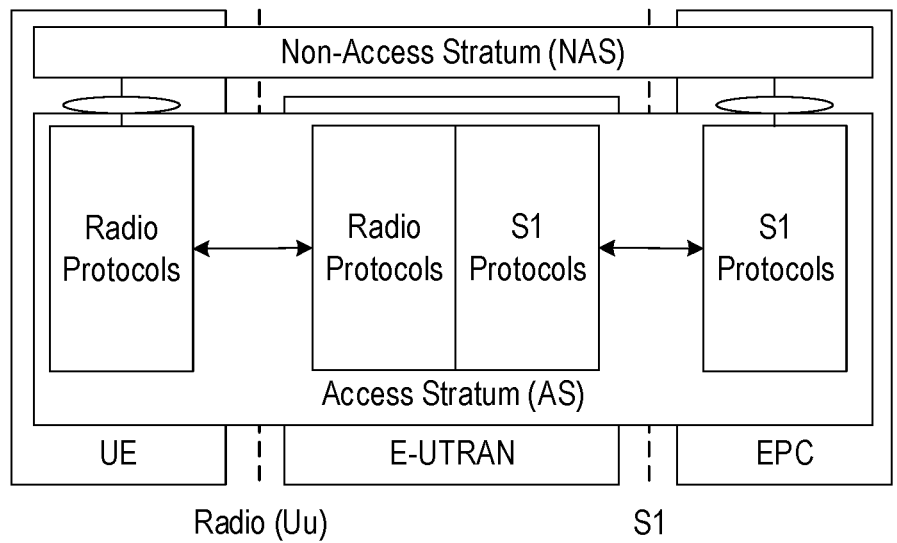
FIG. 2A is a high-level block diagram of an exemplary E-UTRAN architecture in terms of its constituent components, protocols, and interfaces.
Figure 2B:
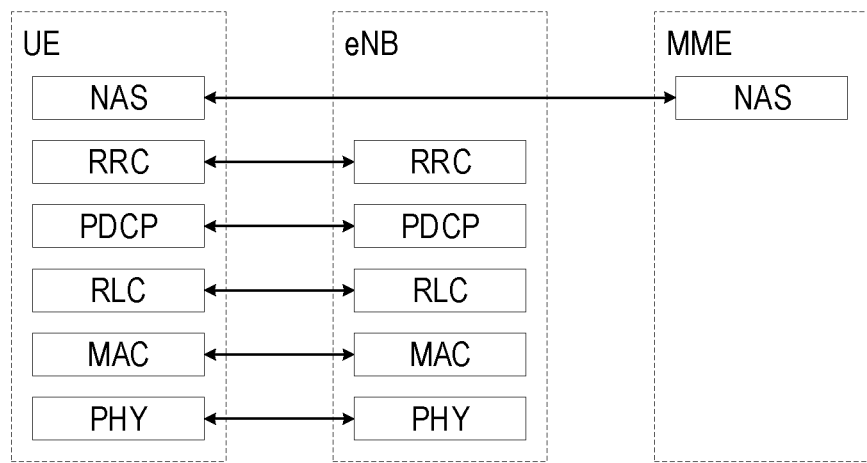
FIG. 2B is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are given by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (JAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, in both LTE and NR, a UE may spend a substantial part of its energy on decoding PDCCH without detecting a DL scheduling assignment or UL resource grant directed to it. Accordingly, techniques that can reduce unnecessary PDCCH monitoring, allow a UE to go to sleep more often, and/or allow a UE to wake up less frequently can be beneficial. This is discussed in more detail below after the following description of NR network architectures and radio interface.

Figure 3:
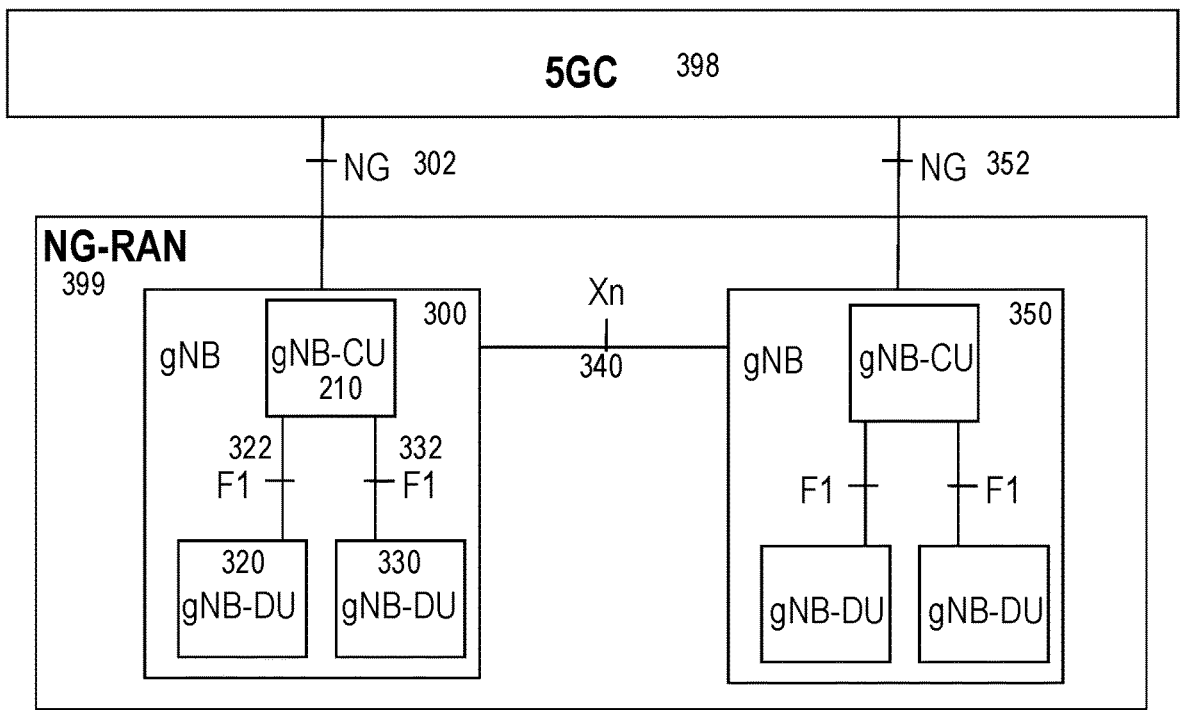
FIGS. 3-4 show two high-level views of an exemplary fifth-generation (5G, also referred to as "New Radio" or NR) network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 (and described in 3GPP TS 38.301 and 3GPP TR 38.801) include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
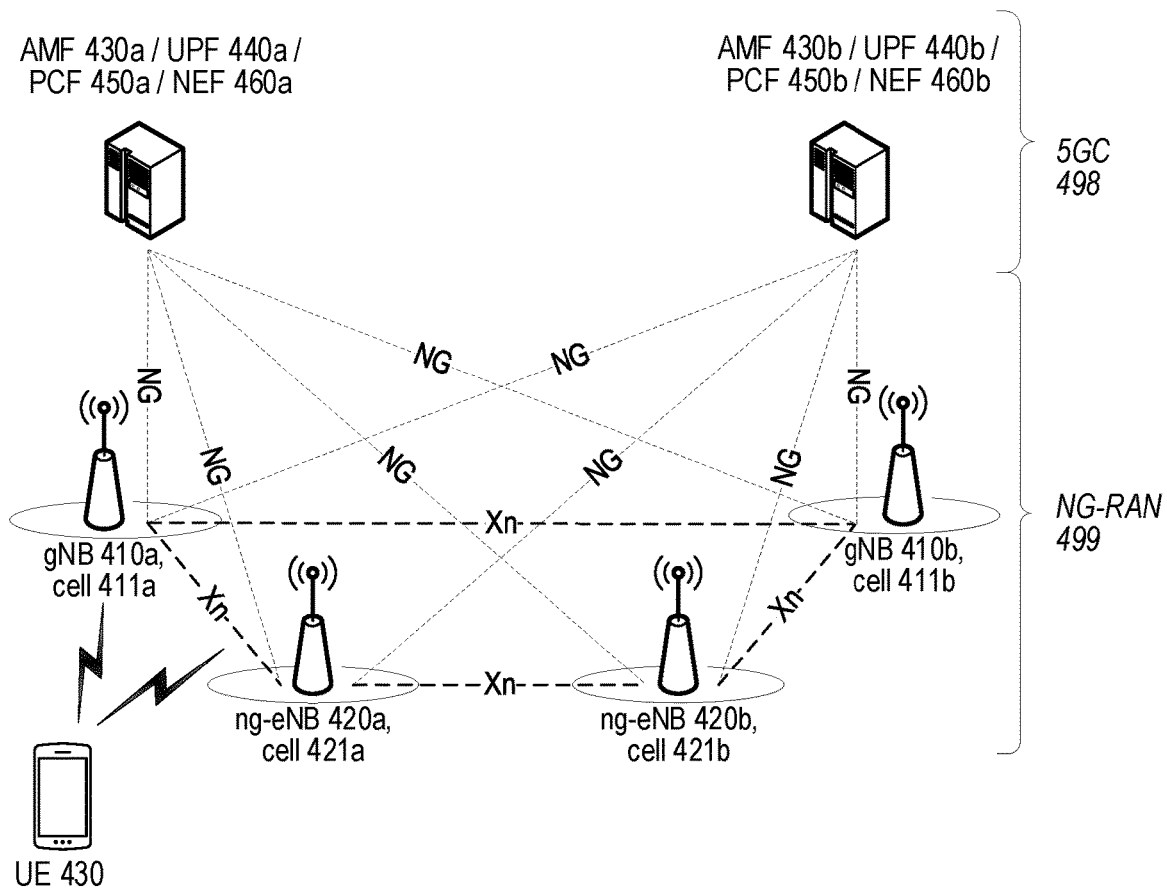

FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430a,b) via respective NG-C interfaces and to the UPF (User Plane Function) 440 (e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 430 can communicate with the gNB or ng-eNB serving that particular cell via the NR or LTE radio interface, respectively.

Figure 5:
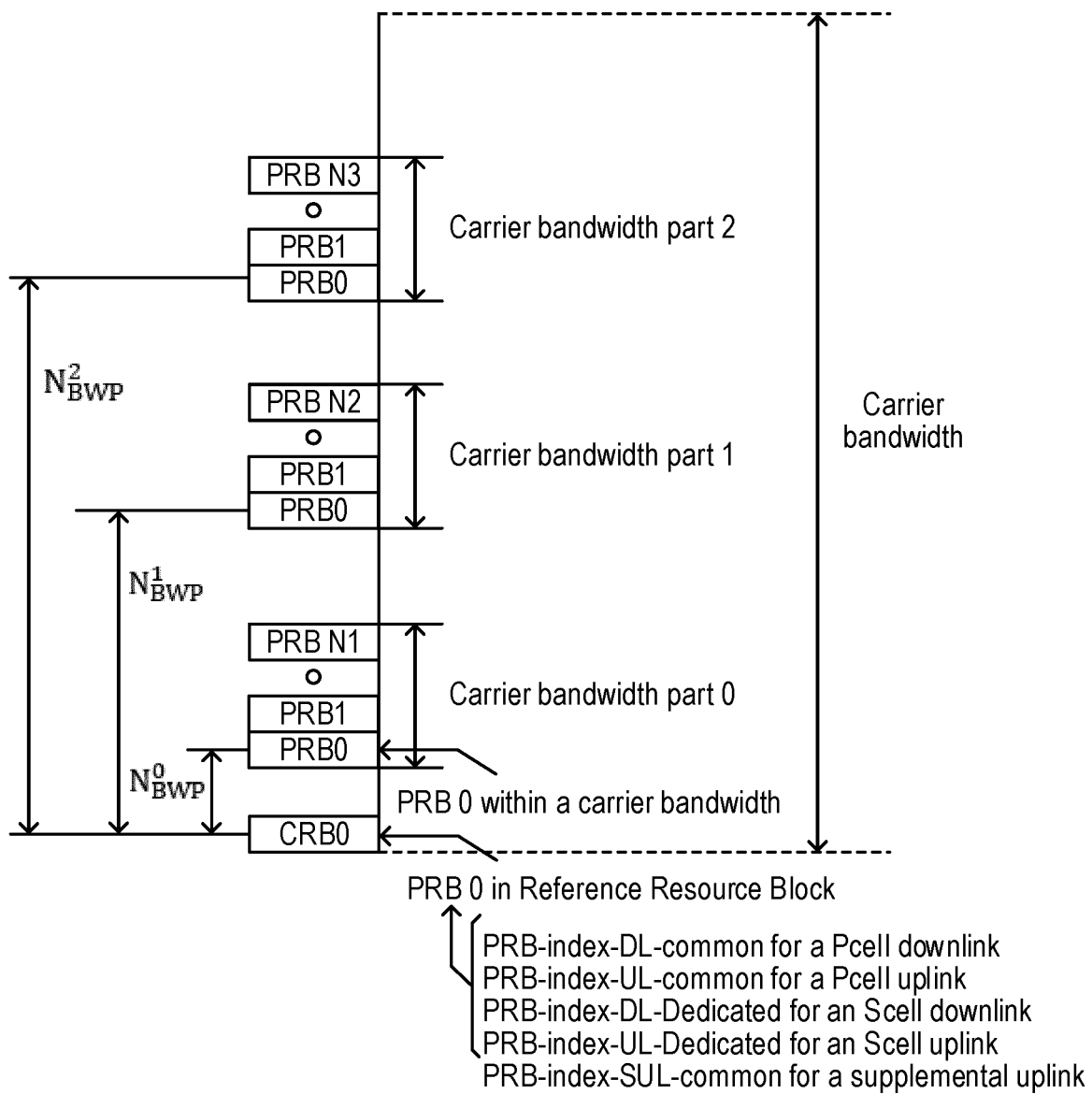
FIG. 5 shows an exemplary frequency-domain configuration for a 5G/NR UE.

FIG. 5 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15 \times 2^\mu)$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^\mu * 50$ MHz.

Table 1 below summarizes the supported NR numerologies and associated parameters. Different DL and UL numerologies can be configured by the network.

TABLE 1

| $\mu$ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 µs | 66.67 µs | 71.35 µs | 1 ms | 50 MHz |
| 1 | 30 | Normal | 2.34 µs | 33.33 µs | 35.68 µs | 0.5 ms | 100 MHz |
| 2 | 60 | Normal, Extended | 1.17 µs | 16.67 µs | 17.84 µs | 0.25 ms | 200 MHz |
| 3 | 120 | Normal | 0.59 µs | 8.33 µs | 8.92 µs | 125 µs | 400 MHz |

TABLE 1-continued

| μ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 4 | 240 | Normal | 0.29 μs | 4.17 μs | 4.46 μs | 62.5 μs | 800 MHz |

FIG. 6 shows an exemplary time-frequency resource grid for an NR slot. As illustrated in FIG. 6, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

FIG. 7A shows an exemplary NR slot configuration comprising 14 symbols, where the slot and symbols durations are denoted $T_S$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. FIG. 7B shows an exemplary mini-slot arrangement in which the mini-slot begins in the third symbol of the slot and is two symbols in duration. Applications of mini-slots include unlicensed spectrum and latency-critical transmission (e.g., URLLC). However, mini-slots are not service-specific and can also be used for eMBB or other services.

FIG. 7C shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6C, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe. In NR, however, each REG consists of all 12 REs of one OFDM symbol in a RB, whereas an LTE REG includes only four REs. The CORESET time domain size can be configured by an RRC parameter. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the five-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the TB Size (TBS) for the PDSCH according to the procedure defined in 3GPP TS 38.214 V15.0.0 clause 5.1.3.2.

Figure 8:
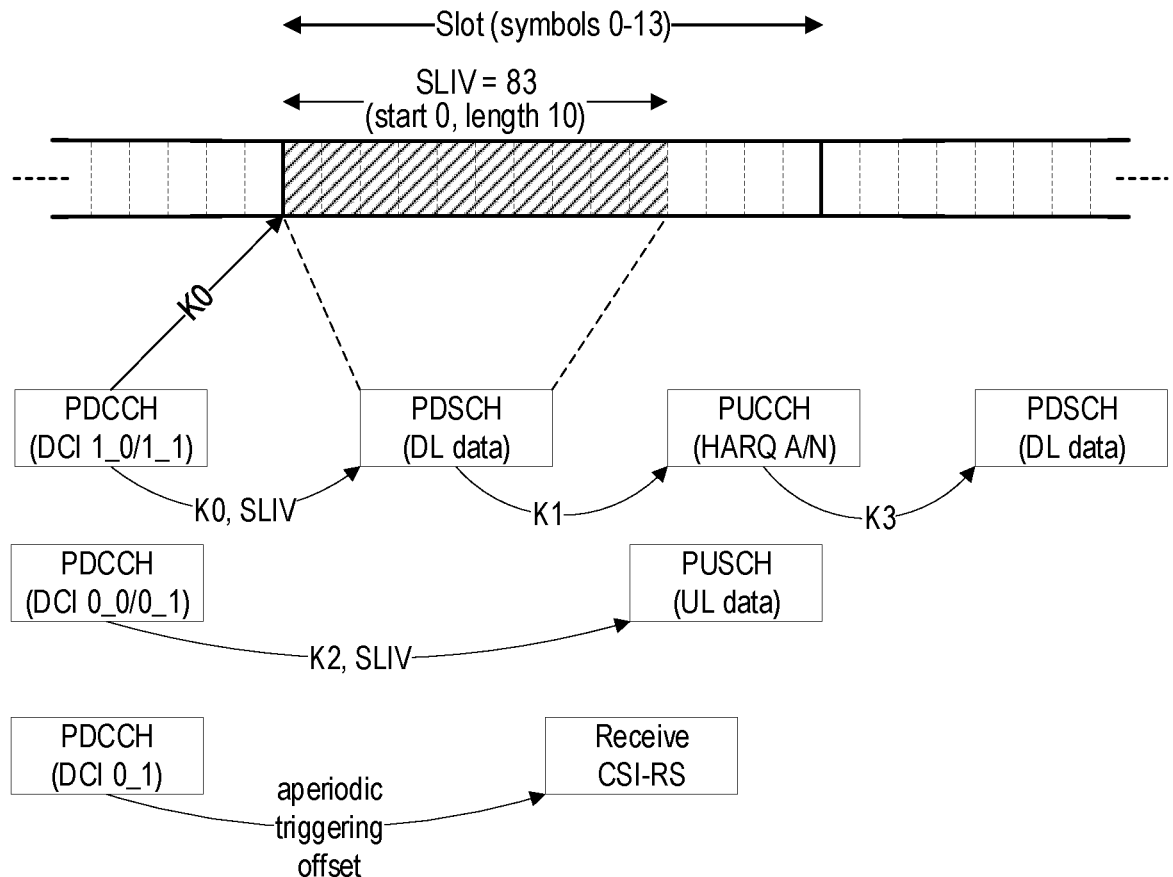
FIG. 8 illustrates various timing offsets between a physical data control channel (PDCCH) and various other signals or channels in a cell of an NR network.

DCI can also include information about various timing offsets (e.g., in slots or subframes) between PDCCH and PDSCH, PUSCH, HARQ, and/or CSI-RS. FIG. 8 illustrates various timing offsets between PDCCH, PDSCH, PUSCH, HARQ, and CSI-RS for NR. For example, offset K0 represents the number of slots between the UE's PDCCH reception of a PDSCH scheduling DCI (e.g., formats 1_0 or 11) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 01) and the subsequent PUSCH transmission. Each of these offsets can take on values of zero and positive integers.

Finally, DCI format 0_1 can also include a network request for a UE report of channel state information (CSI) or channel quality information (CQI). Prior to sending this report, the UE receives and measures CSI-RS transmitted by the network. The parameter aperiodicTriggeringOffset represents the integer number of slots between the UE's reception of a DCI including a CSI request and the network's transmission of the CSI-RS. This parameter can take on values 0-4.

Offset K0 is part of a UE's PDSCH time-domain resource allocation (TDRA) provided by the network node. Also included in the PDSCH TDRA is a slot length indicator values (SLIV), which identifies a particular combination of a starting symbol (S) and a length (L) of the time-domain allocation for PDSCH. In general, S can be any symbol 0-13 and L can be any number of symbols beginning with S until the end of the slot (i.e., symbol 13). The SLIV can be used as a look-up table index to find the associated (S, L) combination. FIG. 8 shows an exemplary PDSCH TDRA having an arbitrary K0 slot offset and SLIV=83, which corresponds to starting symbol 0 and length of 10 symbols in the slot indicated by K0. Similarly, offset K2 is part of a UE's PUSCH TDRA provided by the network node, which also includes a corresponding SLIV.

For NR, the scheduling offsets shown in FIG. 8 can be larger than zero, which facilitates both same-slot (zero offset) and cross-slot (non-zero offset) scheduling. For example, cross-slot scheduling may be desirable for facilitating UE power savings by adaptively changing between upper and lower BWPs for PDCCH and PDSCH, respectively.

Table 2 below summarizes the contents of an exemplary DCI format 1_0 with CRC scrambled by C-RNTI/CS_RNTI. Note that with respect to the frequency domain resource assignment, $N_{RB}^{DL,BWP}$ is the size of the active DL bandwidth part in case DCI format 1_0 is monitored in the UE specific search space and satisfying the conditions: 1) total number of different DCI sizes configured to monitor is no more than 4 for the cell, and 2) the total number of different DCI sizes with C-RNTI configured to monitor is no more than 3 for the cell. Otherwise, $N_{RB}^{DL,BWP}$ is the size of CORESET 0.

TABLE 2

| Field | Size (bits) | Description |
| --- | --- | --- |
| Identifier for DCI formats | 1 | Value set to 1, indicating a DL DCI format. |
| Frequency domain resource assignment | $[\log_2(N_{RB}^{DL,BWP}(N_{RB}^{DL,BWP} + 1)/2)]$ | |
| Time domain resource assignment | 4 | 3GPP TS 38.214 § 5.1.2.1 |
| VRB-to-PRB mapping | 1 | |
| Modulation and coding scheme (MCS) | 5 | |
| New data indicator (NDI) | 1 | |
| Redundancy version (RV) | 2 | |
| HARQ process number | 4 | |
| Downlink assignment index | 2 | 3GPP TS 38.213 § 9.1.3 |
| TPC command for scheduled PUCCH | 2 | 3GPP TS 38.213 § 7.2.1 |
| PUCCH resource indicator | 3 | 3GPP TS 38.213 § 9.2.3 |
| PDSCH-to-HARQ feedback timing indicator (K1) | 3 | 3GPP TS 38.213 § 9.2.3 |

Figure 9:
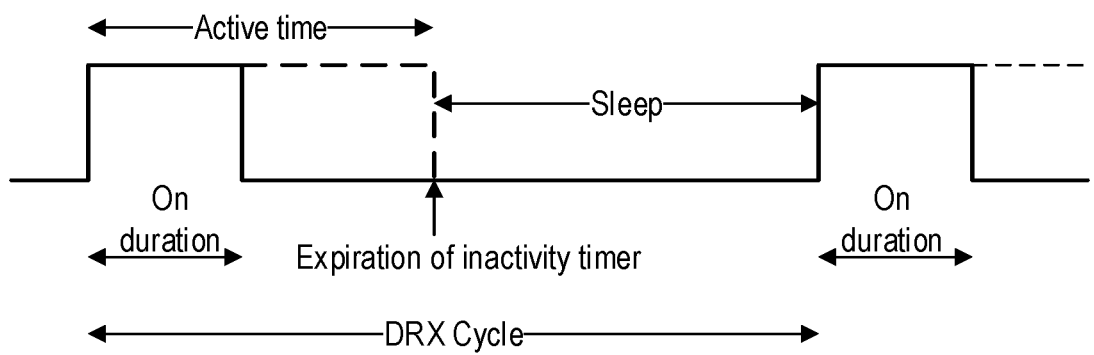
FIG. 9 shows a timing diagram that illustrates exemplary UE discontinuous reception (DRX) operation.

Discontinuous reception (DRX) is another technique that has been used to reduce UE energy consumption and prolong UE battery life. At a high level, DRX allows a UE to transition to lower power state whenever it is not required to receive any transmission from the network (e.g., gNB). FIG. 9 shows a timing diagram that illustrates exemplary DRX operation. As shown in FIG. 9, DRX operation is based on a DRX cycle, an On duration, and an inactivity timer (other parameters can be used but are omitted here for simplicity of explanation). The UE is awake and monitors PDCCH during the On duration. If no valid DCI addressed to the UE is detected during the On duration, the UE stops PDCCH monitoring until next occurrence of the On duration. On the other hand, if a valid DCI addressed to the UE is detected during the On duration, the UE initiates the inactivity timer and continues to monitor PDCCH until either the UE again detects valid DCI addressed to it or the inactivity timer expires.

The period from the beginning of the On duration until inactivity timer expiration can be referred to as "active time." If the UE receives a valid DCI while the inactivity timer is running, it extends the inactivity timer and continues to monitor PDCCH. On the other hand, if the inactivity timer expires, the UE can stop PDCCH monitoring until the end of the DRX cycle and go to sleep until the beginning of the next DRX cycle.

In general, the inactivity timer counts the number of consecutive PDCCH-subframe(s)/slots after the subframe/slot in which a PDCCH indicates an initial UL, DL or sidelink (SL, i.e., UE-to-UE) user data transmission for a medium access control (MAC) entity. Typically, there is one MAC entity per configured cell group, e.g., one for the master cell group (MCG) and another for the secondary cell group (SCG). Furthermore, the DRX parameters are typically configured by RRC, which typically operates on a much slower or longer time-scale than lower layers such as MAC and PHY. As such, the DRX parameters discussed above cannot be changed adaptively via RRC, especially if the UE has a mixture of traffic types.

Typically, the UE is configured, via RRC, with a set of possible (or candidate) values for each of the scheduling offsets, i.e., K0, K1, K2, and aperiodicTriggeringOffset. However, even if the UE is aware of this set of candidate offsets, it only finds out about the particular offset (e.g., K0 for PDSCH) associated with a particular PDCCH after decoding the scheduling message carried by that PDCCH (e.g., the DCI). As such, if the UE has configured an energy-saving operating state, the UE may not have sufficient time to change to another operating state to comply with a PDCCH-signaled offset. This is particularly true if the configured set of values for an offset (e.g., K0) includes low offset values (e.g., 0 indicating the possibility of same-slot scheduling).

Such issues can impact various energy-saving techniques used by a UE. For example, a UE may use a BWP having a relatively small bandwidth for PDCCH reception and a different BWP having a larger bandwidth for PDSCH reception. Alternative techniques to reduce energy consumption include modifying the active BWP setting based on the PDCCH search space information, turning off the UE's receiver chain off between PDCCH reception and PDSCH/CSI-RS reception, and/or monitoring PDCCH with a single antenna but switching to PDSCH reception using multiple antennas (e.g., if multi-layer PDSCH transmission is used). Each of these techniques requires a finite amount of time to switch configurations, which may be more or less than the DCI-signaled scheduling offset. However, if the minimum RRC-configured scheduling offset is less than the amount of time required for the energy-saving technique, the UE is faced with a choice between disabling the energy-saving technique to accommodate the minimum scheduling offset, or enabling the energy-saving technique at the risk of missing a PDSCH/PUSCH/CSI-RS scheduled at the minimum offset.

NR Rel-16 includes a cross-slot scheduling mechanism that can make the UE potentially aware of the minimum offset values. However, this mechanism is optional and does not apply to all NR UEs, particularly UEs of earlier releases (e.g., Rel-15). Furthermore, for same-slot scheduling, the SLIV determines the starting symbol for the scheduled PDSCH (or PUSCH) in the same slot as the PDCCH. SLIVs indicating relatively later starting symbols within the same slot (i.e., a relatively large symbol offset from PDCCH) may still provide sufficient time for the UE to utilize one or more of the energy-savings mechanisms discussed above. However, the UE has no advance knowledge of any constraints on a minimum SLIV symbol offset value that it can receive in a scheduling DCI, so it must account for receiving SLIVs with any of the symbol offsets specified in relevant 3GPP specifications.

Accordingly, exemplary embodiments of the present disclosure mitigate, reduce, and/or eliminate these and other exemplary problems, issues, and/or drawbacks by providing a flexible mechanisms by which the UE can learn typical PDCCH scheduling characteristics, e.g., with respect to SLIV, K0, K1, K2, and/or aperiodicTriggeringOffset. The UE can exploit such knowledge in order to determine when and/or whether to apply energy-saving techniques in relation to transmission or reception of signals or channels that can be scheduled by PDCCH (e.g., PDSCH, PUSCH, PUCCH, CSI-RS, SRS, etc.). In particular, a UE may adapt its transmission and/or reception patterns based on the predicted scheduling characteristics, one or more UE operating conditions, and/or one or more communication characteristics of application(s) running on the UE.

As an example, when the UE's stored energy (i.e., in a battery) is below a threshold and/or the UE's operating temperature is above a threshold, the UE can adapt its transmission and/or reception behavior to a lower-energy operating state based on such operating conditions independent of any prior knowledge about predicted PDCCH scheduling characteristics. In such case, if the UE misses a scheduled initial PDSCH transmission due to the adapted behavior, the UE can indicate to the need for retransmission to the network (e.g., via hybrid ARQ (HARQ) negative acknowledgement (NACK). If the UE observes that such retransmissions are occurring too frequently, the UE can adapt its transmission and/or reception behavior to a higher-energy operating state during the initial PDSCH transmissions.

Exemplary embodiments can provide various benefits and/or advantages. For example, UEs operating according to these embodiments can enjoy reduced energy consumption and, consequently, longer battery life and longer usage on a single battery charge. In addition, embodiments can provide reduced energy consumption for all UEs without requiring support for any particular 3GPP release. Put differently, such embodiments can be implemented without any impact to existing 3GPP specifications.

In some embodiments, the UE can obtain knowledge regarding scheduling delays by observing RRC-configured offset values that have not been indicated by a scheduling DCI received via PDCCH. The UE can observe and/or monitor such characteristics over a time interval. For example, the UE can observe that, even though K0=0 is configured as a possible PDSCH scheduling offset, the scheduling DCIs indicate K0≥1 (i.e., cross-slot scheduling). Accordingly, the UE can determine a predicted K0≥1, with K0=1 being the predicted minimum scheduling offset.

The time interval used for determining the predicted scheduling characteristics may include a predetermined number of slots, frames, PDCCH transmission instances/monitoring occasions, etc. The predicted scheduling characteristics can be determined per individual node (e.g., gNBs), per node/cell type (e.g., macro/micro/femto), per tracking area, etc. The predicted scheduling characteristics can be based on scheduling DCIs targeted at the UE and, in some embodiments, scheduling DCIs targeted at other UEs (e.g., with different C-RNTIs).

In some embodiments, the predicted scheduling characteristics can include a fraction and/or percentage of scheduling offsets greater than a minimum value. For example, the UE can determine the portion of offsets K0, K1, K2, and/or aperiodicTriggeringOffset that are greater than zero (e.g., cross-slot scheduling). Alternately, for same-slot scheduling, the UE can determine the portion of SLIV symbol offsets that are greater than zero. Non-zero minimum values can also be employed.

In some embodiments, the UE can determine more detailed predicted scheduling characteristics such as minimum scheduling offset per UE operating state and/or configuration. For example, the UE can determine predicted scheduling characteristics that are associated with particular values of any of the following operating states and/or configurations:
  active BWP;
  active secondary cell (SCell);
  DRX On duration;
  traffic type (e.g., eMBB, URLLC, QoS value, etc.);
  spectrum type (e.g., licensed or unlicensed);
  RNTI type (e.g., C-RNTI, CS-RNTI, P-RNTI, etc.);
  PDCCH search space (SS) configuration; and
  CORESET configuration.

As an example, the UE may determine that the network typically schedules the UE with higher offsets in sparser SS configurations and lower offsets in more dense SS configurations (or vice versa). As another example, the UE may determine that the network typically schedules the UE with higher offsets in a first active BWP (e.g., cross-slot), while typically employing lower offsets (e.g., same-slot) in a second active BWP. As yet another example, the UE may determine that the network typically schedules the UE with non-zero minimum offset value (e.g., SLIV, K0, etc.) in a first SCell but typically uses a zero minimum offset value in a second SCell. As yet another example, the UE may determine that, at certain times of the day, the network schedules a transmission during a relatively small portion of the UE's DRX On durations (or alternately not at the beginning of On durations), while at other times of the day, the network schedules a transmission during a relatively larger portion of the UE's DRX On durations. As a related example, the UE can determine that at certain times of day, the network schedules transmissions an average of T_SchedDelay ms after the beginning of the UE's DRX On duration.

In some embodiments, the UE may determine the predicted scheduling characteristics by active learning instead of passive learning, such as in the embodiments described above. For example, the UE may assume a certain minimum offset value for a BWP, and then apply an operation mode change (e.g., turning off the RF frontend for a duration) according to this assumed minimum offset value. The UE can observe whether it consistently misses a PDSCH transmission. If so, the UE can responsively reduce the assumed minimum offset value and the corresponding duration of the operation mode change (e.g., decrease the time the RF frontend is off). Eventually, the UE can arrive at a predicted minimum offset value that enables it to receive a sufficient portion of PDSCH transmissions according to some predetermined criteria.

In some embodiments, the UE may determine the predicted scheduling characteristics in relation to activities of one or more applications running on the UE. Each application may send an UL transmission to a corresponding application server coupled to the wireless network. The application server may require a processing time before it responds to the UL transmission with a DL transmission. The UE can determine characteristics of the required processing and/or response time per application and/or per time of day. For example, the UE may determine that for a particular application at a particular time of day, the network schedules a responsive DL transmission from the application server an average of X ms after the UL transmission from the UE application.

In some embodiments, the UE may enter and/or apply an operational mode based on the predicted PDCCH scheduling characteristics (e.g., minimum offset values). For example, the UE can predict a minimum scheduling offset (e.g., K0, K2, etc.) with a certain probability higher than a threshold (e.g., 95% probability of K0≥1 slot, 90% probability of K2≥1 slot, etc.). In some embodiments, the UE can also predict a scheduling periodicity, e.g., that the network schedules the UE to send a CSI report every N slots but with a certain minimum offset value. Based on such predicted information, the UE may decide to enter a low-energy state for a first duration after receiving a PDCCH during a PDCCH monitoring occasion (MO), and then return to a higher-energy state after the first duration. For example, the first duration can be determined based on decoding the PDCCH DCI (e.g., while in the low-energy state) to find a scheduling grant for a time resource after the end of the first duration. Alternately, the first duration can be until the next PDCCH MO (e.g., based on no DCI scheduling grant) or until a configured grant occasion (e.g., for a periodic CSI report).

In these embodiments, if the UE enters a low-energy state (e.g., turning off receiver chain) during the first duration after successive PDCCH MOs based on the predicted minimum offset, but determines that a portion of the PDCCHs carry DCI with scheduling grants of resources during the first duration, the UE may decide to return to the higher-energy state (e.g., turning on receive chain) during each first duration following PDCCH MOs. In other words, the UE does not apply the predicted minimum offset after entering the higher-energy state.

In some embodiments, the UE may enter the low-energy state during the first duration after PDCCH MOs regardless of (i.e., independent from) minimum scheduling offsets predicted based on past network behavior. For example, this decision can be based on the energy stored in the UE's battery dropping below a first threshold, and/or the UE's operating temperature rising above a second threshold. In such case, the UE effectively "assumes" that the network always applies a certain minimum scheduling offset (e.g., cross-slot scheduling) in scheduling DCIs, and thus remains in the low-energy state according to this "assumption". The UE can continue operating in the low-energy state until it receives an UL grant in a scheduling PDCCH, e.g., for HARQ ACK/NAK. This can indicate that the UE missed a scheduled PDSCH transmission while in the low-energy state. In such case, the UE can send a HARQ NACK according to the UL grant, thereby requesting retransmission of the data in the missed PDSCH.

In some embodiments, the UE's use of the predicted minimum scheduling offsets can also be conditioned on various other configuration parameters and/or operating states. For example, if the UE is operating in a licensed spectrum or band, it can enter the low-energy state during the first duration according to the predicted minimum offset (e.g., K0≥1). On the other hand, if the UE is operating in an unlicensed spectrum or band, it can remain in a higher-energy state after a first number of PDCCH MOs in listen-before-talk (LBT) (e.g., assuming K0≥0), and then enter a low-energy state during the first duration after subsequent PDCCH MOs based on the predicted minimum offset (e.g., K0≥1). Similarly, the UE can remain in a higher-energy state after PDCCH MOs during an application-related T_SchedDelay period (discussed above), based on the assumption of a low probability for missing a scheduled PDSCH reception. After T_SchedDelay, the UE can then enter the low-energy state during the first duration after subsequent PDCCH MOs according to the predicted minimum offset (e.g., K0≥1).

As discussed above, the UE may miss a scheduled PDSCH and transmit a HARQ NACK after receiving indication of the missed PDSCH. In response, the network can start a retransmission procedure or resend a PDCCH scheduling the PDSCH. After transmitting the HARQ NACK, the UE can also ignore the predicted minimum offset (e.g., K0) after one or more subsequent PDCCH MOs. In other words, the UE can monitor for a scheduled PDSCH during the first duration after PDCCH MOs that follow the UE's transmission of the HARQ NACK. The UE can remain in a higher-energy state while doing so.

In general, the UE estimates block error rate (BLER) on received PDSCH transmissions, which the UE uses to determine a channel quality indicator (CQI) value to be reported to the network. The network uses the reported CQI values for link adaptation (e.g., changing a modulation and coding scheme) to maintain a target BLER. When the UE misses a PDSCH while remaining in the low-energy state during the first duration, as discussed above, the missed PDSCH negatively impacts actual BLER. As such, in some embodiments, the UE can determine an estimated increase in PDSCH BLER based on an assumption that the channel was transmitted during the first duration, and the report an CQI reflecting this estimate increase in BLER. In this manner, the UE can bias CQI reports to indicate higher BLER, so that network can use a more robust link such that missed PDSCH with have lower effect on UE performance.

In some embodiments, the UE may determine whether to apply a minimum offset value assumption by jointly considering both the expected reduction in energy consumption and the expected PDSCH (or PUSCH) BLER degradation. For example, if the UE is scheduled infrequently and/or with short data bursts, most PDCCH MOs are not utilized for scheduling the UE. In such case, the UE may prioritize the energy-reduction by using the minimum offset and accept possible BLER degradation. As another example, if the UE is scheduled frequently and/or with long contiguous data bursts, the energy reduction from using a minimum offset assumption may be relatively small or negligible (e.g., compared to PDSCH reception/PUSCH transmission) In such case, the UE may prioritize the BLER/throughput and not use the minimum offset.

In addition to an amount of energy remaining in the UE's battery and the UE's operating temperature, the UE can also base the decision of whether to refrain from receiving or transmitting during the first duration on various other UE operating conditions. Exemplary operating conditions can include UE transition time between low-energy and higher-energy states, amount of energy reduction in the low-energy state, potential increase in BLER due to failure to transmit or receive the signal or channel (discussed above), and potential loss of throughput due to failure to transmit or receive the signal or channel.

As a specific example, if the UE expects a relatively large amount of data traffic, it may forego the low-energy state during the first duration, even if it predicts a minimum scheduling offset greater than the first duration. Alternately, if the UE expects a relatively small amount of data traffic, the UE can enter the low-energy state during the first duration after some or all of the PDCCH MOs.

In some embodiments, the UE can also base the decision of whether to refrain from receiving or transmitting during the first duration on a characteristic of a received PDCCH. For example, if the PDCCH CRC is scrambled by a P-RNTI, the UE may forego the low-energy state during the first duration, even if it predicts a minimum scheduling offset greater than the first duration. Alternately, if the PDCCH CRC is scrambled by a C-RNTI, the UE can enter the low-energy state during the first duration after some or all of the PDCCH MO.

The embodiments described above can be further illustrated with reference to the exemplary method (e.g., procedure) shown in FIG. 10, described below. Put differently, various features of the operations described below correspond to various embodiments described above.

Figure 10A:
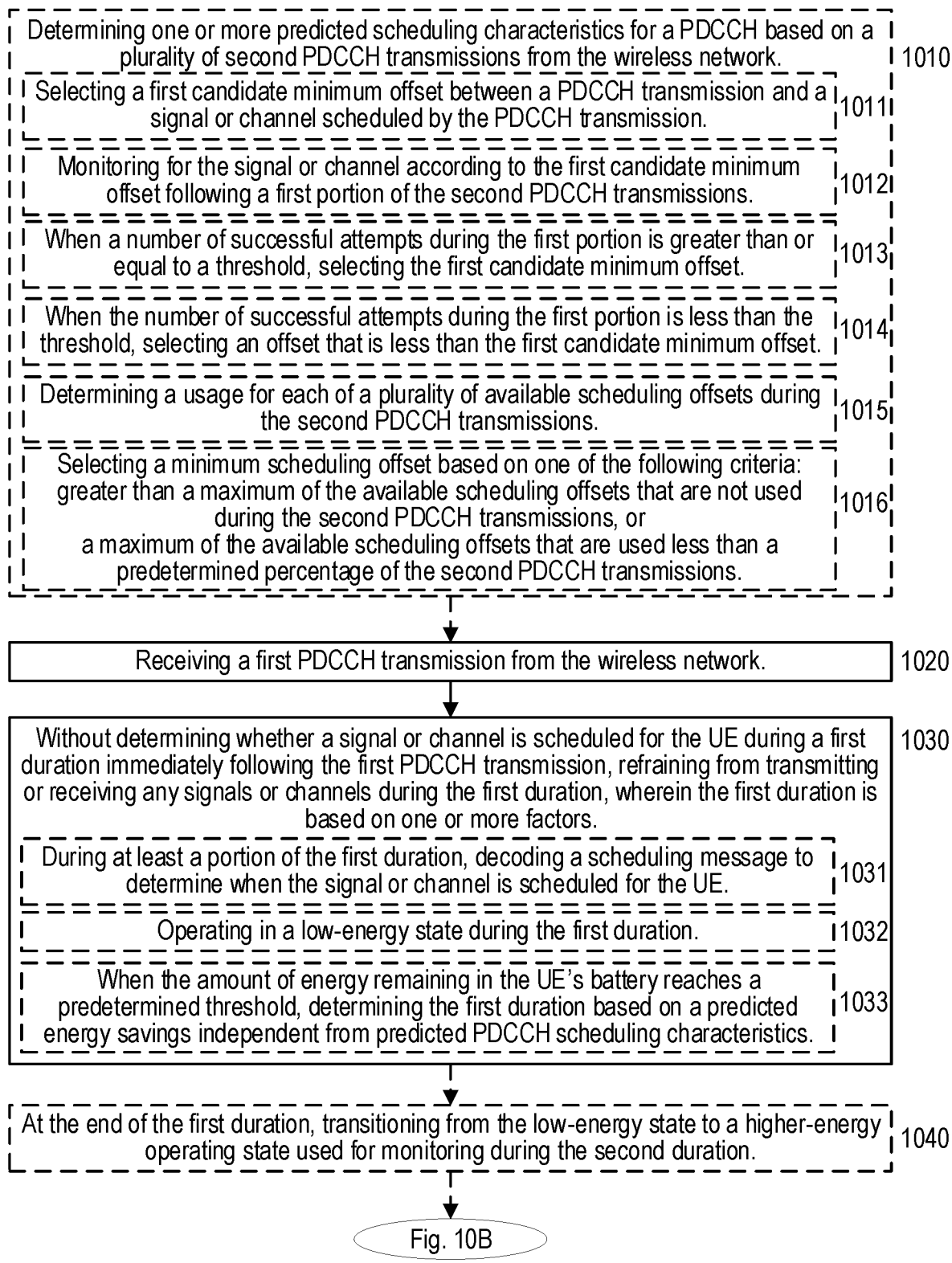
FIGS. 10A-B, shows a flow diagram of an exemplary method performed by a user equipment (UE, e.g., wireless device, MTC device, NB-IoT device, etc.), according to various exemplary embodiments of the present disclosure.
Figure 10B:
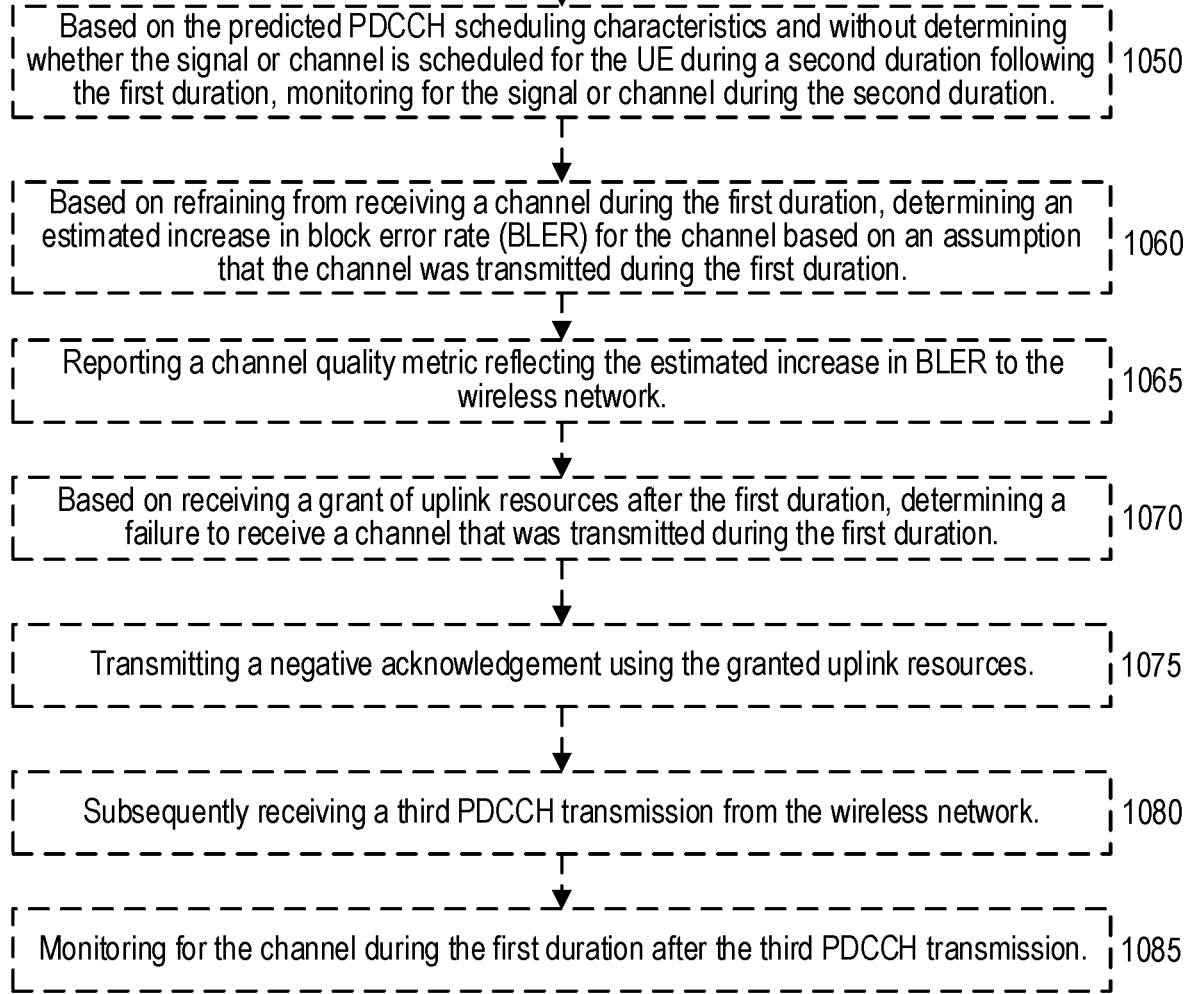

In particular, FIG. 10 shows a flow diagram of an exemplary method (e.g., procedure) for selective transmission or reception of signals or channels with a wireless network, according to various exemplary embodiments of the present disclosure. The exemplary method can be performed by a user equipment (UE, e.g., wireless device, MTC device, NB-IoT device, modem, etc. or component thereof) in communication with a wireless network (e.g., E-UTRAN, NG-RAN). For example, the exemplary method shown in FIG. 10 can be implemented in a UE configured according to other figures described herein. Although FIG. 10 shows specific blocks in a particular order, the operations of the exemplary method can be performed in a different order than shown and can be combined and/or divided into blocks with different functionality than shown. Optional blocks or operations are indicated by dashed lines.

The exemplary method can include the operations of block 1020, where the UE can receive a first physical downlink control channel (PDCCH) transmission from the wireless network. The exemplary method can also include the operations of block 1030, where the UE can, without determining whether a signal or channel is scheduled for the UE during a first duration immediately following the first PDCCH transmission, refrain from transmitting or receiving any signals or channels during the first duration. The first duration can be based on one or more of the following: one or more predicted scheduling characteristics for the PDCCH; one or more UE operating conditions; and one or more communication characteristics of an application running on the UE.

In some embodiments, the first PDCCH transmission can include an encoded scheduling message. In such embodiments, the operations of block 1030 can include the operations of sub-block 1031, where the UE can, during at least a portion of the first duration, decode the scheduling message to determine when the signal or channel is scheduled for the UE.

In other embodiments, the exemplary method can also include the operations of block 1050, where the UE can, based on the predicted scheduling characteristics for the PDCCH and without determining whether the signal or channel is scheduled for the UE during a second duration following the first duration, monitor for the signal or channel during the second duration. In such embodiments, the operations of block 1030 can include the operations of sub-block 1032, where the UE can operate in a low-energy state during the first duration. In such embodiments, the exemplary method can also include the operations of block 1040, where the UE can, at the end of the first duration, transition from the low-energy state to a higher-energy operating state used for the monitoring during the second duration.

In some embodiments, the predicted scheduling characteristics for the PDCCH can include one or more predicted minimum offsets between a PDCCH transmission and respective signals or channels scheduled by the PDCCH transmission. In such embodiments, the first duration can be the predicted minimum offset associated with the signal or channel.

In some of these embodiments, the predicted minimum offsets can be based on respective values of one or more configuration parameters, or respective combinations of values of a plurality of configuration parameters. In some of these embodiments, the predicted minimum offset can be zero for a first value or a first combination of values (e.g., indicating same-slot scheduling) and non-zero for a second value or a second combination of values (e.g., indicating cross-slot scheduling). In such embodiments, the configuration parameters can include any of the following: active bandwidth part (BWP); active secondary cell (SCell); use of cross-carrier scheduling; discontinuous reception (DRX) On duration; traffic type; licensed or unlicensed spectrum; radio network temporary identifier (RNTI) type; target block error rate (BLER); PDCCH search space configuration; and CORESET configuration.

In various embodiments, the one or more predicted minimum offsets can include any of the following:
 a first predicted minimum offset between a PDCCH transmission and physical downlink shared channel (PDSCH) transmission scheduled by the PDCCH transmission;
 a second predicted minimum offset between a PDSCH transmission, scheduled by the PDCCH transmission, and a subsequent physical uplink control channel (PUCCH) transmission;
 a third predicted minimum offset between a PDCCH transmission and physical uplink shared channel (PUSCH) transmission scheduled by the PDCCH transmission;
 a fourth predicted minimum offset between a PDCCH transmission and a DL reference signal (RS) scheduled by the PDCCH transmission; and
 a fifth predicted minimum offset between a PDCCH transmission and an UL sounding reference signal (SRS) scheduled by the PDCCH transmission.

In some embodiments, the exemplary method can also include the operations of block 1010, wherein the UE can determine the one or more predicted scheduling characteristics of the PDCCH based on a plurality of second PDCCH transmissions, from the wireless network, that were received prior to the first PDCCH transmission. This can be done in various ways, such as those described below.

In some embodiments, the determining operations in block 1010 can include sub-blocks 1011-1013. In sub-block 1011, the UE can select a first candidate minimum offset between a PDCCH transmission and a signal or channel scheduled by the PDCCH transmission (e.g., PDSCH, PUSCH, CSI-RS, etc.). In sub-block 1012, the UE can monitor for the signal or channel according to the first candidate minimum offset following a first portion of the second PDCCH transmissions. In sub-block 1013, the UE can, when a number of successful attempts during the first portion is greater than or equal to a threshold, select the first candidate minimum offset as the predicted minimum offset. In some embodiments, the determining operations of block 1010 can also include the operations of sub-block 1014, where the UE can, when the number of successful attempts during the first portion is less than the threshold, select an offset that is less than the first candidate minimum offset as the predicted minimum offset. The operations of sub-blocks 1011-1014 are examples of "active learning," discussed above.

In other embodiments, the determining operations in block 1010 can include sub-blocks 1014-1015. In sub-block 1014, the UE can determine a usage for each of a plurality of available scheduling offsets during the second PDCCH transmissions. The number of available scheduling offsets can depend on the particular signal or channel. In sub-block 1015, the UE can select a minimum scheduling offset based on one of the following criteria:

greater than a maximum of the available scheduling offsets that are not used during the second PDCCH transmissions, or
 a maximum of the available scheduling offsets that are used less than a predetermined percentage of the second PDCCH transmissions.

In some embodiments, the usage for each available scheduling offset can be determined (e.g., in sub-block 1014) in relation to respective values of one or more operating parameters. In various embodiments, the one or more operating parameters can include any of the following:
 amount of energy remaining in the UE's battery;
 operating temperature of the UE;
 UE transition time between low-energy and higher-energy states;
 amount of energy reduction in the low-energy state;
 potential increase in block error rate (BLER) due to failure to transmit or receive the signal or channel; and
 potential loss of throughput due to failure to transmit or receive the signal or channel.

In some embodiments, the operations of block 1030 can include the operations of sub-block 1033, where the UE can, when the amount of energy remaining in the UE's battery reaches a predetermined threshold, determine the first duration based on a predicted energy savings independent from the predicted scheduling characteristics for the PDCCH. In other words, the UE can refrain from receiving or transmitting any signals or channels during the first duration based on energy savings, regardless if the predicted scheduling characteristics indicated a likelihood that a signal or channel will be scheduled during the first duration.

As mentioned above, refraining from transmitting or receiving any signals or channels during the first duration (e.g., in block 1030) can be based on one or more communication characteristics of an application running on the UE. In various embodiments, the communication characteristics of the application running on the UE include any of the following:
 estimated delay between an uplink transmission associated with the application and scheduling of a responsive downlink transmission; and
 likelihood of scheduling downlink transmissions associated with the application during UE discontinuous reception (DRX) On durations and/or particular times of day.

In some of these embodiments, the first duration can correspond to the estimated delay or a duration when the likelihood of scheduling downlink transmissions associated with the application is below a threshold.

In some embodiments, the exemplary method can also include the operations of blocks 1060-1065. In block 1060, the UE can, based on refraining from receiving a channel (e.g., PDSCH) during the first duration, determine an estimated increase in block error rate (BLER) for the channel based on an assumption that the channel was transmitted during the first duration. In block 1065, the UE can report a channel quality metric reflecting the estimated increase in BLER to the wireless network.

In some embodiments, the exemplary method can also include the operations of blocks 1070-1075. In block 1070, the UE can, based on receiving a grant of uplink resources after the first duration, determine a failure to receive a channel that was transmitted during the first duration. In block 1075, the UE can transmit a negative acknowledgement using the granted uplink resources. For example, the non-received channel can be a PDSCH and the negative acknowledgement can be a HARQ NACK for a transport block of data carried by the PDSCH.

In some of these embodiments, the exemplary method can also include the operations of blocks 1080-1085. In block 1080, the UE can subsequently (e.g., after transmitting the negative acknowledgement in block 1075) receive a third PDCCH transmission from the wireless network. In block 1080, the UE can monitor for the channel during the first duration after the third PDCCH transmission. For example, the first and third PDCCH transmissions can be in respective first and third timeslots, and the first duration can be a remaining portion of a timeslot (e.g., first or third) after a PDCCH transmission (e.g., first or third). Put differently, rather than refraining from transmitting or receiving as in the first duration of the first timeslot (e.g., remaining in a low-energy state), the UE can monitor for (e.g., attempt to receive) a signal in the first duration of the third timeslot (e.g., in a higher-energy state).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 11:
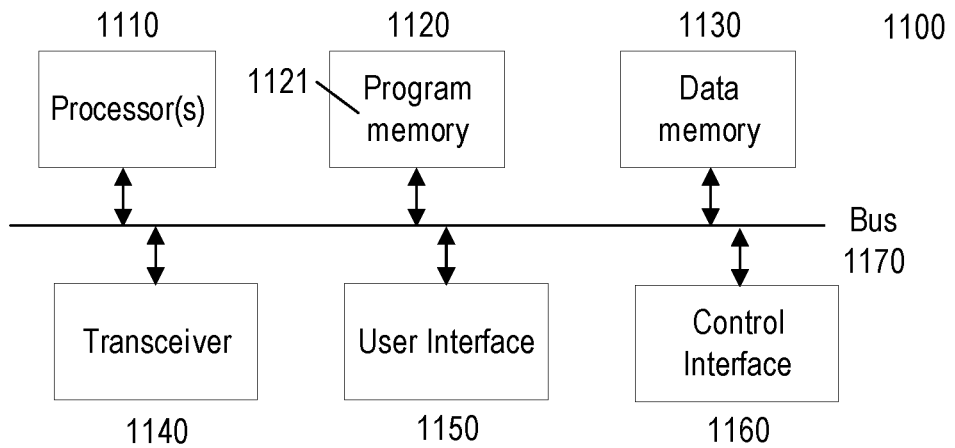
FIG. 11 shows a block diagram of an exemplary wireless device or UE, according to various exemplary embodiments of the present disclosure.

FIG. 11 shows a block diagram of an exemplary wireless device or user equipment (UE) 1100 (hereinafter referred to as "UE 1100") according to various embodiments of the present disclosure, including those described above with reference to other figures. For example, UE 1100 can be configured by execution of instructions, stored on a computer-readable medium, to perform operations corresponding to one or more of the exemplary methods described herein.

UE 1100 can include a processor 1110 (also referred to as "processing circuitry") that can be operably connected to a program memory 1120 and/or a data memory 1130 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 11) that, when executed by processor 1110, can configure and/or facilitate UE 1100 to perform various operations, including operations corresponding to various exemplary methods described herein. As part of or in addition to such operations, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1120 that corresponds to MAC, RLC, PDCP, and RRC layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1120 that, together with radio transceiver 1140, implements device-to-device (D2D) communications with other compatible devices and/or UEs.

Program memory 1120 can also include software code executed by processor 1110 to control the functions of UE 1100, including configuring and controlling various components such as radio transceiver 1140, user interface 1150, and/or control interface 1160. Program memory 1120 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1120 can comprise an external storage arrangement (not shown) remote from UE 1100, from which the instructions can be downloaded into program memory 1120 located within or removably coupled to UE 1100, so as to enable execution of such instructions.

Data memory 1130 can include memory area for processor 1110 to store variables used in protocols, configuration, control, and other functions of UE 1100, including operations corresponding to, or comprising, any of the exemplary methods described herein. Moreover, program memory 1120 and/or data memory 1130 can include non-volatile memory (e.g., flash memory), volatile memory (e.g., static or dynamic RAM), or a combination thereof. Furthermore, data memory 1130 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1120 and data memory 1130 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like wireless communication standards and/or protocols. In some exemplary embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some exemplary embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some exemplary embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1120 in conjunction with, and/or supported by, data memory 1130.

User interface 1150 can take various forms depending on the particular embodiment of UE 1100, or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1100 having a touch screen display are capable of receiving user inputs, such as inputs related to exemplary methods described herein or otherwise known to persons of ordinary skill.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate ninety-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the UE 1100 can take various forms depending on the particular exemplary embodiment of UE 1100 and of the particular interface requirements of other devices that the UE 1100 is intended to communicate with and/or control. For example, the control interface 1160 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the UE 1100, including any program code corresponding to and/or embodying any exemplary embodiments (e.g., of methods) described herein.

Figure 12:
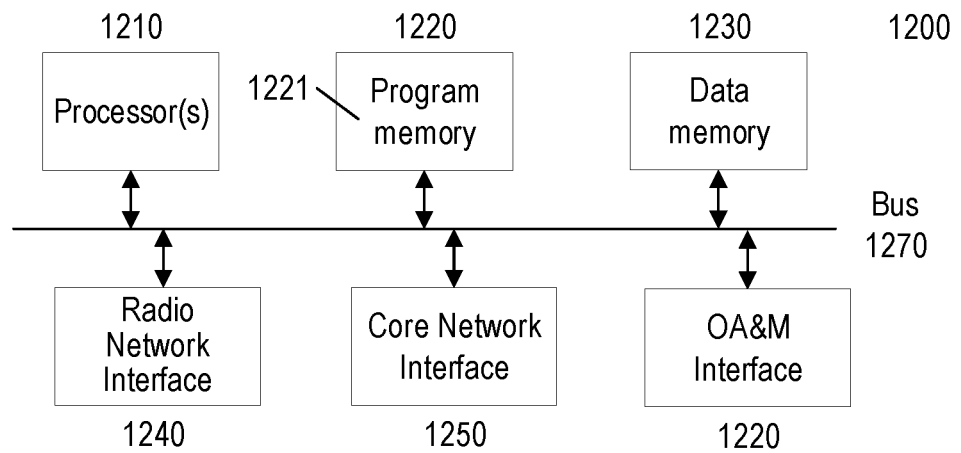
FIG. 12 shows a block diagram of an exemplary network node according to various exemplary embodiments of the present disclosure.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods described herein. In some exemplary embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, the functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations, including operations corresponding to various exemplary methods described herein. As part of and/or in addition to such operations, program memory 1220 can also include software code executed by processor 1210 that can configure and/or facilitate network node 1200 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1240 and/or core network interface 1250. By way of example, core network interface 1250 can comprise the S1 or NG interface and radio network interface 1240 can comprise the Uu interface, as standardized by 3GPP. Program memory 1220 can also comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some exemplary embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some embodiments, core network interface 1250 can comprise the NG interface standardized by 3GPP. In some exemplary embodiments, core network interface 1250 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1200 can include hardware and/or software that configures and/or facilitates network node 1200 to communicate with other network nodes in a RAN, such as with other eNBs, gNBs, ng-eNBs, en-gNBs, IAB nodes, etc. Such hardware and/or software can be part of radio network interface 1240 and/or core network interface 1250, or it can be a separate functional unit (not shown). For example, such hardware and/or software can configure and/or facilitate network node 1200 to communicate with other RAN nodes via the X2 or Xn interfaces, as standardized by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
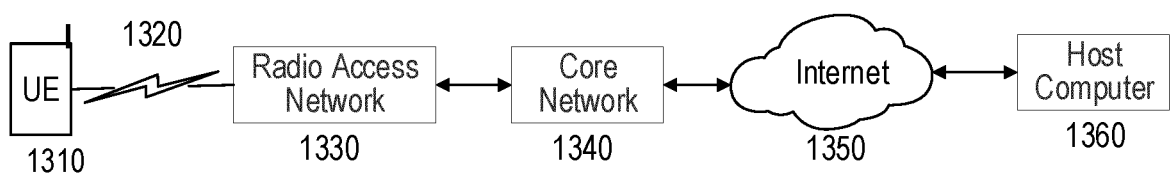
FIG. 13 shows a block diagram of an exemplary network configured to provide over-the-top (OTT) data services between a host computer and a UE, according to various exemplary embodiments of the present disclosure.

FIG. 13 is a block diagram of an exemplary communication network configured to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1350 described above. In some exemplary embodiments, RAN 1330 and core network 1340 can be configured and/or arranged as shown in other figures discussed above. For example, eNBs comprising an E-UTRAN 1330 can communicate with an EPC core network 1340 via an S1 interface. As another example, gNBs and ng-eNBs comprising an NG-RAN 1330 can communicate with a 5GC core network 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible mechanisms by which a UE can learn typical PDCCH scheduling characteristics, e.g., with respect to SLIV, K0, K1, K2, and/or aperiodicTriggeringOffset. The UE can exploit such knowledge in determining when and/or whether to apply energy-saving techniques in relation to transmission or reception of signals or channels that can be scheduled by PDCCH (e.g., PDSCH, PUSCH, PUCCH, CSI-RS, SRS, etc.). Such techniques allow UEs to reduce overall energy consumption without significant impact to end-user experience. When used in NR UEs (e.g., UE 1310), such techniques can result in longer UE battery life and longer UE usage on a single battery charge, including for end-user access to OTT services.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method performed by a user equipment (UE) for selective transmission or reception of a signal or channel with a wireless network, the method comprising:
receiving a first physical downlink control channel (PDCCH) transmission from the wireless network; and
without determining whether a signal or channel is scheduled for the UE during a first duration immediately following the first PDCCH transmission, refraining from transmitting or receiving any signals or channels during the first duration, wherein the first duration is based on one or more of the following:
one or more predicted scheduling characteristics for the PDCCH;
one or more UE operating conditions; and
one or more communication characteristics of an application running on the UE;
wherein the one or more predicted scheduling characteristics for the PDCCH include one or more of the following predicted minimum offsets:
a first predicted minimum offset between a PDCCH transmission and physical downlink shared channel (PDSCH) transmission scheduled by the PDCCH transmission;
a second predicted minimum offset between a PDSCH transmission, scheduled by the PDCCH transmission, and a subsequent physical uplink control channel (PUCCH) transmission;
a third predicted minimum offset between a PDCCH transmission and physical uplink shared channel (PUSCH) transmission scheduled by the PDCCH transmission;
a fourth predicted minimum offset between a PDCCH transmission and a downlink reference signal (RS) scheduled by the PDCCH transmission; and
a fifth predicted minimum offset between a PDCCH transmission and a uplink sounding reference signal (SRS) scheduled by the PDCCH transmission.

2. The method of claim 1, wherein:
the first PDCCH transmission includes an encoded scheduling message; and
refraining from transmitting or receiving any signals or channels during the first duration comprises, during at least a portion of the first duration, decoding the scheduling message to determine when the signal or channel is scheduled for the UE.

3. The method of claim 1, further comprising, based on the predicted scheduling characteristics for the PDCCH and without determining whether the signal or channel is scheduled for the UE during a second duration following the first duration, monitoring for the signal or channel during the second duration.

4. The method of claim 3, wherein:
refraining from transmitting or receiving any signals or channels during the first duration comprises operating in a low-energy state during the first duration; and
the method further comprises, at the end of the first duration, transitioning from the low-energy state to a higher-energy operating state used for the monitoring during the second duration.

5. The method of claim 1, wherein the first duration is one of the one or more predicted minimum offsets.

6. The method of claim 1, wherein the one or more predicted minimum offsets are based on one of the following:
respective values of one or more configuration parameters; or
respective combinations of values of a plurality of configuration parameters.

7. The method of claim 6, wherein the configuration parameters include any of the following:
active bandwidth part (BWP);
active secondary cell (SCell);
use of cross-carrier scheduling;
discontinuous reception (DRX) On duration;
traffic type;
licensed or unlicensed spectrum;
radio network temporary identifier (RNTI) type;
target block error rate (BLER);
PDCCH search space configuration; and
CORESET configuration.

8. The method of claim 6, wherein the one or more predicted minimum offsets include:
a predicted minimum offset of zero, for a first value or a first combination of values; and
a non-zero predicted minimum offset, for a second value or a second combination of values.

9. The method of claim 1, further comprising determining the one or more predicted scheduling characteristics based on a plurality of second PDCCH transmissions, from the wireless network, that were received prior to the first PDCCH transmission.

10. The method of claim 9, wherein determining the one or more predicted scheduling characteristics based on the second PDCCH transmissions comprises:
selecting a first candidate minimum offset between a PDCCH transmission and a signal or channel scheduled by the PDCCH transmission;
monitoring for the signal or channel according to the first candidate minimum offset following a first portion of the second PDCCH transmissions; and
when a number of successful attempts during the first portion is greater than or equal to a threshold, selecting the first candidate minimum offset as the predicted minimum offset.

11. The method of claim 10, wherein determining the one or more predicted scheduling characteristics based on the first PDCCH transmissions further comprises, when the number of successful attempts during the first portion is less than the threshold, selecting an offset that is less than the first candidate minimum offset as the predicted minimum offset.

12. The method of claim 9, wherein determining the one or more predicted scheduling characteristics based on the second PDCCH transmissions comprises:
determining a usage for each of a plurality of available scheduling offsets during the second PDCCH transmissions; and
selecting a predicted minimum offset based on one of the following criteria:
greater than a maximum of the available scheduling offsets that are not used during the second PDCCH transmissions, or
a maximum of the available scheduling offsets that are used less than a predetermined percentage of the second PDCCH transmissions.

13. The method of claim 12, wherein the usage for each available scheduling offset is further determined in relation to respective values of one or more operating parameters.

14. The method of claim 1, wherein the one of more UE operating conditions include any of the following:
- amount of energy remaining in the UE's battery;
- operating temperature of the UE;
- UE transition time between low-energy and higher-energy states;
- amount of energy reduction in the low-energy state;
- potential increase in block error rate (BLER) due to failure to transmit or receive the signal or channel; and
- potential loss of throughput due to failure to transmit or receive the signal or channel.

15. The method of claim 14, wherein refraining from transmitting or receiving any signals or channels during the first duration further comprises, when the amount of energy remaining in the UE's battery reaches a predetermined threshold, determining the first duration based on a predicted energy savings independent from the predicted scheduling characteristics for the PDCCH.

16. The method of claim 1, wherein the communication characteristics of the application running on the UE include any of the following:
- estimated delay between an uplink transmission associated with the application and scheduling of a responsive downlink transmission; and
- likelihood of scheduling downlink transmissions associated with the application during one or more of the following: UE discontinuous reception (DRX) On durations, and particular times of day.

17. The method of claim 1, wherein the first duration corresponds to one of the following:
- the estimated delay; or
- a duration when the likelihood of scheduling downlink transmissions associated with the application is below a threshold.

18. The method of claim 1, further comprising:
- based on refraining from receiving a channel during the first duration, determining an estimated increase in block error rate (BLER) for the channel based on an assumption that the channel was transmitted during the first duration; and
- reporting a channel quality metric reflecting the estimated increase in BLER to the wireless network.

19. The method of claim 1, further comprising:
- based on receiving a grant of uplink resources after the first duration, determining a failure to receive a channel that was transmitted during the first duration; and
- transmitting a negative acknowledgement using the granted uplink resources.

20. The method of claim 19, further comprising:
- subsequently receiving a third PDCCH transmission from the wireless network; and
- monitoring for the channel during the first duration after the third PDCCH transmission, wherein:
  - the first and third PDCCH transmissions are in respective first and third timeslots; and
  - the first duration is a remaining portion of a timeslot after a PDCCH transmission.

21. A user equipment (UE) configured for selective transmission or reception of signals or channels with a wireless network, the UE comprising:
- radio transceiver circuitry configured to communicate with the wireless network; and
- processing circuitry operatively coupled to the radio transceiver circuitry, whereby the processing circuitry and the radio transceiver circuitry are configured to:
  - receive a first physical downlink control channel (PDCCH) transmission from the wireless network; and
  - without determining whether a signal or channel is scheduled for the UE during a first duration immediately following the first PDCCH transmission, refrain from transmitting or receiving any signals or channels during the first duration, wherein the first duration is based on one or more of the following:
    - one or more predicted scheduling characteristics for the PDCCH;
    - one or more UE operating conditions; and
    - one or more communication characteristics of an application running on the UE;
  - wherein the one or more predicted scheduling characteristics for the PDCCH include one or more of the following predicted minimum offsets:
    - a first predicted minimum offset between a PDCCH transmission and physical downlink shared channel (PDSCH) transmission scheduled by the PDCCH transmission;
    - a second predicted minimum offset between a PDSCH transmission, scheduled by the PDCCH transmission, and a subsequent physical uplink control channel (PUCCH) transmission;
    - a third predicted minimum offset between a PDCCH transmission and physical uplink shared channel (PUSCH) transmission scheduled by the PDCCH transmission;
    - a fourth predicted minimum offset between a PDCCH transmission and a downlink reference signal (RS) scheduled by the PDCCH transmission; and
    - a fifth predicted minimum offset between a PDCCH transmission and a uplink sounding reference signal (SRS) scheduled by the PDCCH transmission.

22. A non-transitory, computer-readable medium storing computer-executable instructions that, when executed by processing circuitry of a user equipment (UE) configured for selective transmission or reception of signals or channels with a wireless network, configure the UE to perform operations corresponding to the method of claim 1.

* * * * *